Oct. 14, 1947.         N. A. PULLIAM         2,428,989
MULTICOMPONENT WAVE GENERATOR
Filed Sept. 15, 1943

INVENTOR
N. A. PULLIAM
BY Harry L. Duft
ATTORNEY

Patented Oct. 14, 1947

2,428,989

UNITED STATES PATENT OFFICE 2,428,989

MULTICOMPONENT WAVE GENERATOR

Norman A. Pulliam, Chicago, Ill., assignor to Western Electric Company, Incorporated, New York, N. Y., a corporation of New York Application September 15, 1943, Serial No. 502,403

2 Claims. (Cl. 250—27)

This invention relates to electronic devices and more particularly to an electronic signal generating device adapted to emit a square wave.

In the testing of electrical networks, and particularly in testing electrical devices, such as amplifiers and transformers, for possible distortion, it may be desirable to determine the operating characteristics of the device over a wide range of frequencies. A square wave may be advantageously used in making such tests since it contains theoretically an infinite number of multiples or harmonics of the fundamental frequency and consequently provides a simple and complete means of testing both the amplitude response and the phase shift of a given network in a single test. A convenient way of observing the wave form is to observe it by the use of an oscilloscope.

An object of the present invention is to provide an efficient and effective signal generating device adapted to emit a square wave.

In accordance with one embodiment of this invention, a square wave generator may be provided employing a diode rectifier cathode driving a triode amplifier, both functions being combined in one tube, in which a positive voltage applied to the diode reduces the current of the triode amplifier to zero, while a negative voltage applied to the diode anode permits the normal plate current to flow in the triode, thereby generating a square wave.

Figure 1:
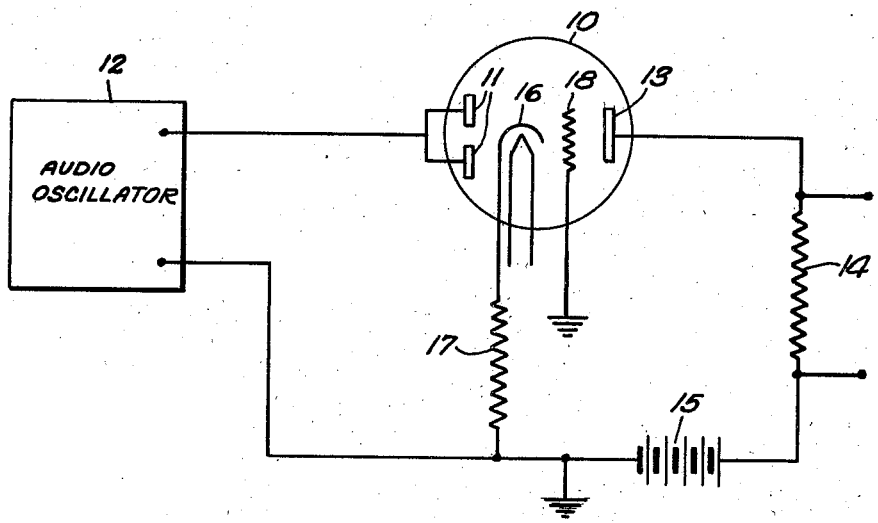
Figure 2:
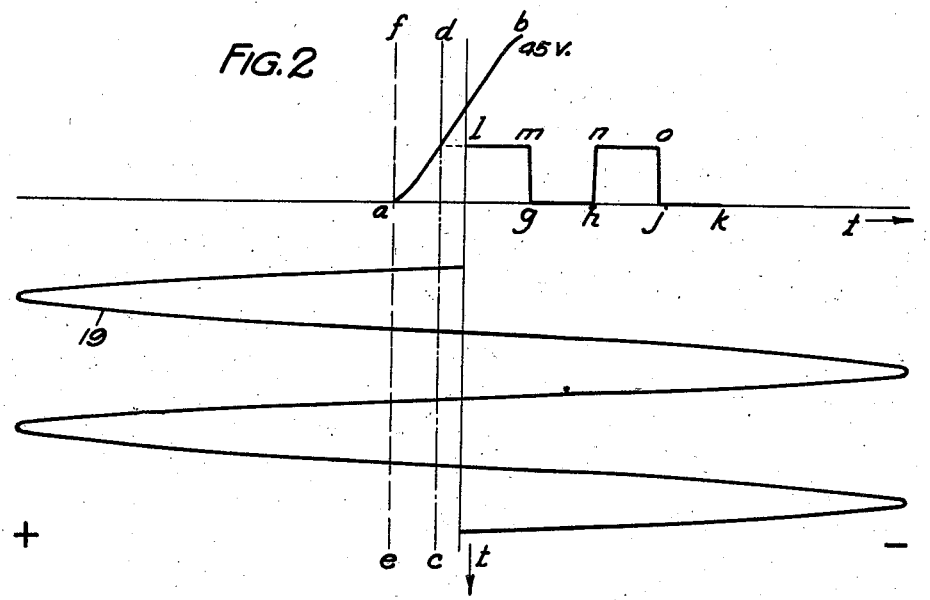

Other objects and advantages of the present invention will be apparent from the following detailed description taken in conjunction with the drawings, wherein Fig. 1 is a schematic view of an apparatus embodying the present invention; and Fig. 2 is a graph illustrating the operation of this circuit.

Referring now to the drawings, and particularly to Fig. 1, an apparatus is there shown for producing a square wave comprising a single vacuum tube 10 having a pair of diode anodes 11 connected together and connected to one side of an alternating current source, such as an audio oscillator 12. The oscillator is selected to produce a sinusoidal wave having a maximum or peak voltage approximately eight to ten times the cut-off voltage of the tube. An anode 13 of the tube 10 is connected through an output load resistor 14 to the positive side of a source 15 of direct current, such as a battery. The negative side of this battery is connected to ground. A cathode 16 of the tube 10 is connected to ground through a biasing resistor 17. A grid 18 of the tube 10 is connected to ground as is the other side of the audio oscillator 12.

In the operation of this apparatus, the plate voltage produced by the battery 15 sets up a positive cathode voltage across the resistor 17 which biases the tube, that is, produces a slight, relatively negative bias on the grid 18. This permits, however, a small amount of current to flow in the plate circuit. The graph in Fig. 2 indicates this condition, the curve $ab$ representing the relation between grid voltage and plate current, while the point on the graph at which this curve intersects the line $cd$, which represents the slight negative bias of the grid, indicates the level of quiescent plate voltage. As an alternating current signal, represented by the sinusoidal wave 19, is applied to the diode electrodes from the audio oscillator 15, the diode section starts to conduct on the positive half of the sinusoid of this signal, that is, electrons begin to flow from the cathode 16 to the diode electrodes 11. This causes an increased voltage drop across the resistor 17, which cathode drives the triode section in a negative direction, that is, causes the grid 18 to become more negative. Since the maximum voltage of this sinusoidal signal is selected to be approximately eight to ten times the cut-off bias of the tube represented by the line $ef$, and since a relatively slight increase in the bias of the grid 18 causes the grid to reach cut-off, it will be apparent that the grid will rapidly reach its cut-off voltage and cause current to cease to flow in the plate circuit. As shown in Fig. 2, the time required for the grid to reach cut-off is a very small part of the time required for the positive half of the sinusoid. This time, of course, can be controlled by varying the voltage of the oscillator signal and the cut-off level of the grid.

So long as the grid is biased beyond cut-off, no current flows in the plate circuit. This condition is indicated on the graph by $gh$ and $jk$. During the negative half of the sinusoid, however, no current is passed by the diode section and the grid returns to its normal bias. Consequently, normal plate current is permitted to flow during this period, as indicated by $lm$ and $no$ on the graph.

When a signal of this type is applied to an oscilloscope, a square wave is traced on the screen. This signal may be amplified if desired and passed through any desired network, as hereinbefore suggested, and its form then observed on an oscilloscope as modified by the conditions of the network or device being tested to indicate these conditions.

What is claimed is:

1. An electrical device for generating a multicomponent electrical wave comprising a tube having a diode section operable to pass current only upon application of positive voltages, a triode section having an anode and a grounded grid, a cathode common to said diode section and to said triode section, a source of unidirectional power having its negative terminal connected to ground and its positive terminal connected through a load resistor to the anode of the triode section, a biasing resistance connected between said cathode and ground, and means connected to the diode section and to ground for applying a sinusoidal voltage to said diode section to cathode-drive said grid beyond the cut-off point of said triode section and thereby to reduce the level of said output energy to zero during the positive portion of said sinusoidal voltage.

2. An electric device for generating a multi-component electrical wave comprising a tube having an anode responsive only to positive voltages, a second anode, a cathode common to both of the said anodes, a grounded grid between the cathode and said second anode, means for energizing said second anode associated with the grid to produce a constant level of output energy, a biasing resistance connected between said cathode and ground, means connected to the said first anode and to the grounded side of the biasing resistor for applying a sinusoidal voltage thereto to bias the grid to reduce said output energy during the positive portion of said sinusoidal voltage.

NORMAN A. PULLIAM.

REFERENCES CITED

The following references are of record in the file of this patent:

UNITED STATES PATENTS

| Number | Name | Date |
| --- | --- | --- |
| 2,153,202 | Nichols | Apr. 4, 1939 |
| 2,048,100 | Burnside | July 21, 1936 |
| 2,209,395 | Fitch | July 30, 1940 |
| 2,276,565 | Crosby | Mar. 17, 1942 |
| 2,340,429 | Rankin | Feb. 1, 1944 |